(12) United States Patent
Alfarano et al.

(10) Patent No.: US 11,314,852 B2
(45) Date of Patent: Apr. 26, 2022

(54) METHOD FOR THE GENERATION OF PERSONALIZED PROFILE PACKAGE DATA IN INTEGRATED CIRCUIT CARDS

(71) Applicant: STMicroelectronics S.r.l., Agrate Brianza (IT)

(72) Inventors: Marco Alfarano, Naples (IT); Giancarlo Pasquariello, Naples (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 506 days.

(21) Appl. No.: 16/414,120

(22) Filed: May 16, 2019

(65) Prior Publication Data

US 2019/0354667 A1 Nov. 21, 2019

(30) Foreign Application Priority Data

May 18, 2018 (IT) .......................... 102018000005510

(51) Int. Cl.
*G06F 21/35* (2013.01)
*G06F 16/907* (2019.01)
(Continued)

(52) U.S. Cl.
CPC ............ *G06F 21/35* (2013.01); *G06F 16/907* (2019.01); *G06F 16/9035* (2019.01); *H04W 4/50* (2018.02);
(Continued)

(58) Field of Classification Search
CPC .... G06F 21/35; G06F 16/907; G06F 16/9035; H04W 4/50; H04W 12/40; H04W 12/42;
(Continued)

(56) References Cited

U.S. PATENT DOCUMENTS 10,339,299 B1 * 7/2019 Magnuson ............ H04L 9/3239
11,005,754 B1 * 5/2021 Baldi .................... H04L 45/306
(Continued)

FOREIGN PATENT DOCUMENTS

EP 1848144 A2 10/2007
WO 03065319 A1 8/2003

OTHER PUBLICATIONS

Simalliance, "eUICC Profile Package: Interoperable Format Technical Specification", Version 1.0, Jun. 25, 2015, 65 pages.

*Primary Examiner* — Rasha S Al Aubaidi
(74) *Attorney, Agent, or Firm* — Slater Matsil, LLP (57) ABSTRACT

A method can be used for the generation of personalized Profile Package data in integrate circuit cards. A table includes data records corresponding to subscriptions to be generated. Each record includes personalization fields to store different types of personalization values. For a given subscription, a file for the Profile Package is in an ASCII format and includes fields to be personalized corresponding to one or more of the fields to store different types of personalization values. The file for the Profile Package in the ASCII format is converted into a hexadecimal code. An offset table is calculated for the given subscription indicating for each field to be personalized a corresponding offset in the hexadecimal profile. The personalization values from the personalization fields are substituted in the corresponding personalization fields to be personalized.

17 Claims, 3 Drawing Sheets

(51) Int. Cl.
*G06F 16/9035* (2019.01)
*H04W 12/42* (2021.01)
*H04W 12/40* (2021.01)
*H04W 8/18* (2009.01)
*H04W 4/50* (2018.01)
*H04L 9/08* (2006.01)
*H04L 9/32* (2006.01)

(52) U.S. Cl.
CPC ............. *H04W 8/18* (2013.01); *H04W 12/40* (2021.01); *H04W 12/42* (2021.01); *H04L 9/0861* (2013.01); *H04L 9/3263* (2013.01)

(58) Field of Classification Search
CPC ... H04W 12/0023; H04W 8/265; H04W 8/20; H04L 63/0428; H04L 9/0816; H04L 9/3252; G06Q 20/341
See application file for complete search history.

(56) References Cited

U.S. PATENT DOCUMENTS

2016/0142906 A1   5/2016   Park et al.
2019/0354667 A1  11/2019  Alfarano et al.
2020/0403783 A1  12/2020  Alfarano et al.

\* cited by examiner

Fig. 1

METHOD FOR THE GENERATION OF PERSONALIZED PROFILE PACKAGE DATA IN INTEGRATED CIRCUIT CARDS

CROSS-REFERENCE TO RELATED APPLICATIONS

This application claims priority to Italian Patent Application No. 102018000005510, filed on May 18, 2018, which application is hereby incorporated herein by reference.

TECHNICAL FIELD

Embodiments of the present disclosure relate to a method for the generation of personalized profile package data in integrated circuit cards, a corresponding system and computer program product.

BACKGROUND

In the eUiCC (embedded UICC) card it is known to provide generation of personalized profile package data.

A Profile is a combination of a file structure, data and applications which are stored in an eUICC. A Profile Package is a Personalized Profile using an interoperable description format which is transmitted to an eUICC in order to load and install a Profile.

For instance the consortium SIMalliance defines an interoperable format to represent a Profile Package as defined for instance in the SIMalliance reference document "eUICC Profile Package: Interoperable Format Technical Specification", available at the URL http://simalliance.org/wp-content/uploads/2015/3/Profile-interoperability-technical-specification_V1-0.pdf. Such interoperable format represents the structure of data to be built by the Profile Creator and to be loaded in the eUICC card in order for the eUICC to be personalized according to the content of the Profile Package. The Profile Creator is an entity in charge of creating the Profile Package based on the MNO (Mobile Network Operator) requirements.

The Profile Package is defined in an ASCII text format, specifically ASN.1 (Abstract Syntax Notation One) and includes a set of fields to be personalized, i.e., in which are to be written values specific of a given subscription, i.e. a subscription to a service accessible through the smart card, e.g. a mobile phone communication service. A Profile Package can be used by systems (servers or eUiCC cards) only after conversion into DER (Distinguished Encoding Rules) format, which is a hexadecimal format. Conversion from ASN.1 to DER format however is very time consuming.

Figure 1:
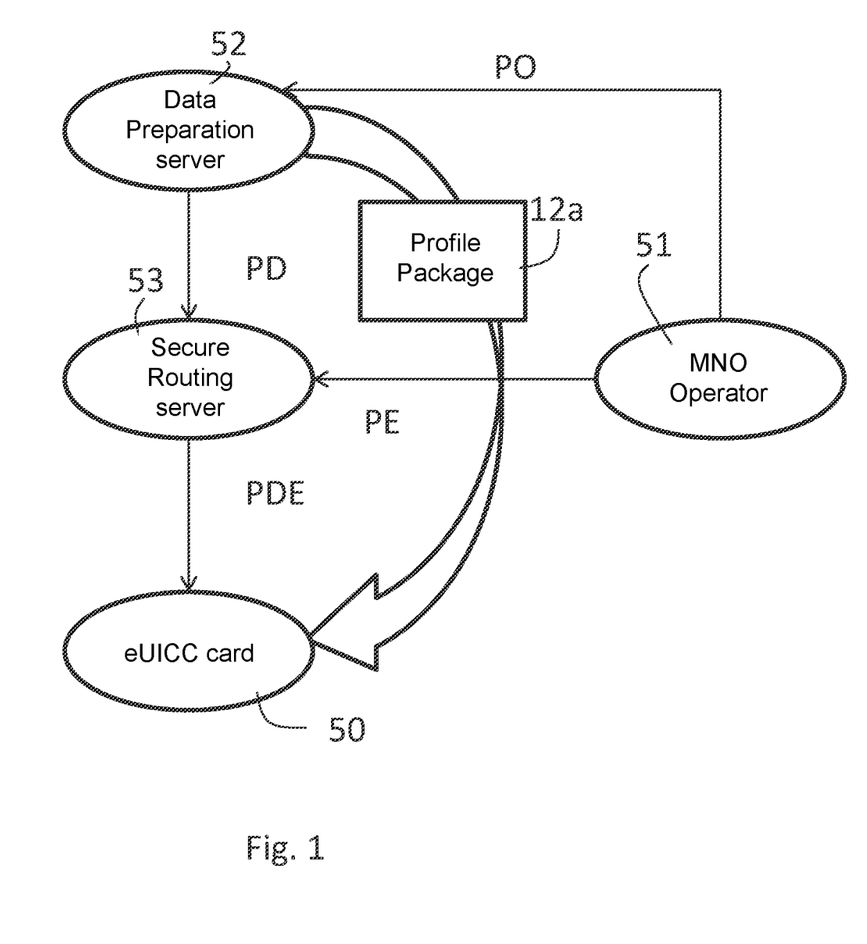

FIG. 1 shows a schematic representation of an example of a system for the personalization of IC cards in which the eUICC card operates.

With the numeric reference 50 is indicated the eUICC card, which for instance resides in a mobile phone, which is not shown in FIG. 1. With 51 is indicated a Mobile Network (MNO) operator which can issue a Profile Ordering PO command to a Data Preparation server 52. Such Data Preparation server 52 in general includes a unique Database of profiles 11a, shown in FIG. 2, which includes a personalization data table 11a better described in the following, and, additionally other modules like an OTA RFM (Over The Air Remote File Management) engine and a Keys Manager. The Data Preparation server 52 substantially can operate also as Data Creator for the personalization of the eUICC 50, i.e., is configured to prepare a personalized Profile Package 12a for a given subscription to be stored in the eUICC 50, for instance through an OTA (Over The Air) channel. In the same time the MNO 51 sends a Profile Enabling PE command to a Secure Routing server 53, which is configured to secure routing of profiles and sends a Profile Download enabling command PDE to the UICC card 50, thus enabling download and storing of the personalized Profile Package 12a in the eUICC card 50.

Figures 2, 3:
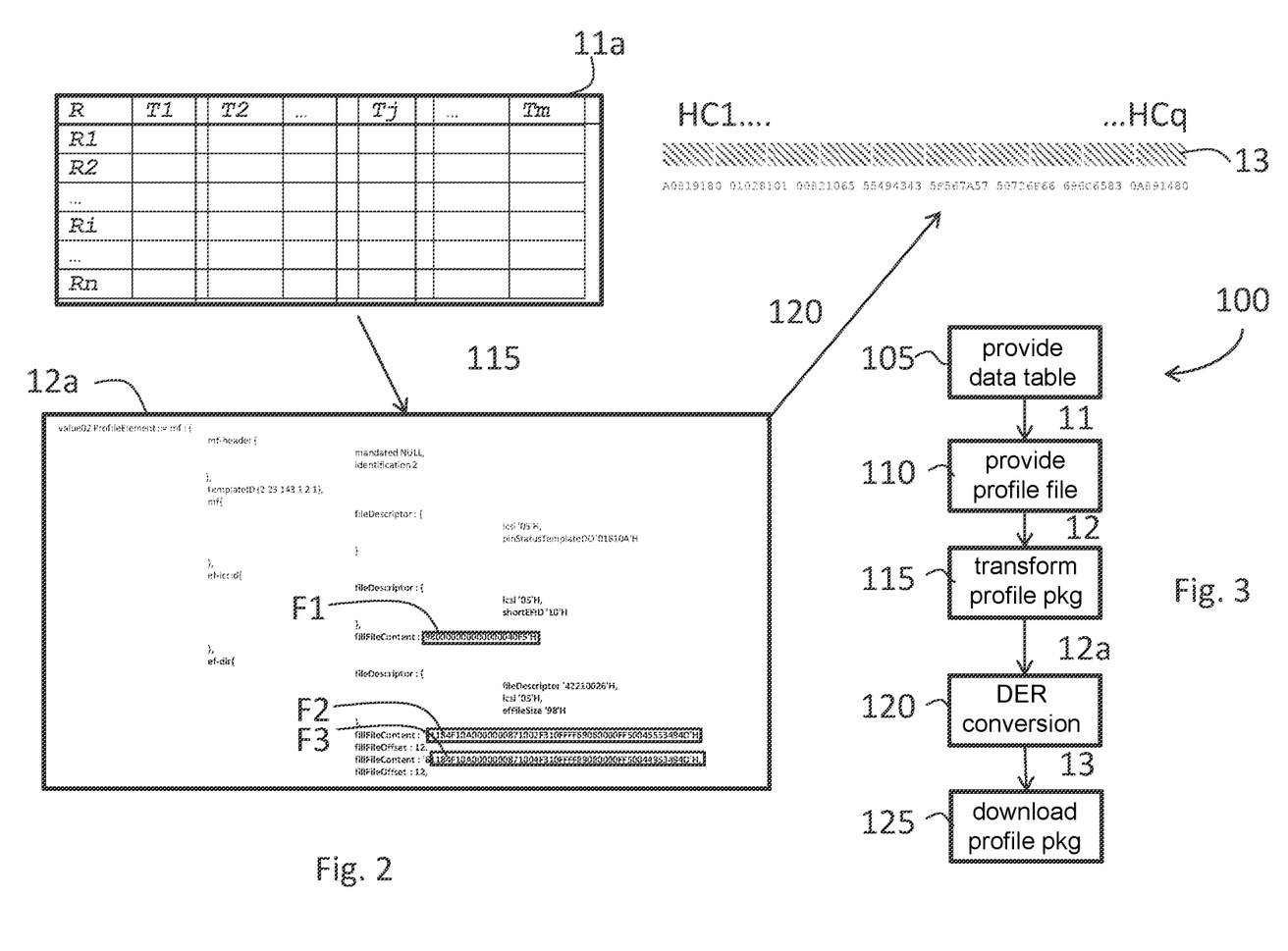

FIG. 3 shows a flow diagram representing a method for the generation of a personalization profile, for instance at the Data Preparation server 52, indicated with the reference 100, using entities 11a, 12a, 13 which are shown in FIG. 2.

The method 100 includes an operation 105 of providing a personalization data table 11a, which in general is part of or it is obtained from the Database of Profiles 11. In the example described such personalization data table 11a is a simple table data structure organized in rows and columns. Such data table 11a includes a plurality of records $R_1 \ldots R_n$, corresponding to the rows of the table 11a. Each i-th record $R_i$ corresponds to a determined i-th integrated circuit card 50 in a set comprising a number n of subscriptions 50 to be personalized with a respective personalized Profile Package 12a. In a personalization procedure, for instance the number n of subscriptions 50, and thus the number n of records R1 ... Rn can amount to one million.

Each column of the personalization data table 11a include then a personalization field $T_1 \ldots T_m$, m being the number of fields in the table 11a, in which a different type of personalization value is stored. In some fields among the personalization fields T1 ... Tm can be stored the Crypto Keys, in other fields the PIN numbers, the Unique Id and other personalization data. A given subscription 50 thus corresponds to a personalization record $R_i$ in which fields are stored the personalization values of that specific given subscription 50. The generic personalization field is indicated by $T_j$, j being the index of the personalization fields going from 1 to m.

Then, with reference to the flow diagram of the method 100 in FIG. 3, in an operation 110 is provided a profile file 12 in which the Profile Package is stored. Such Profile Package is in ASCII format and represented by a ASN.1 text. This Profile Package file 12 is designed for instance by a profile designer, which, on the basis of the eUICC interoperable format mentioned above, designs Profile Elements according to the necessities of the set of subscription 50 to be personalized to which also the table 11a refers.

Thus, such ASCII Profile Package file 12 through such script is written to include a plurality of p fields to be personalized $F_1 \ldots F_k \ldots F_p$, k being the index of the generic field $F_k$, which are in correspondence with a subset or all of the personalization fields T1 ... Tm in the personalization table 11a and in which the personalization values in the corresponding personalization fields T1 ... Tm can be written. These fields to be personalized $F_1 \ldots F_k \ldots F_p$ in the Profile Package file 12 accept hexadecimal values and usually are initialized (prior the substitution operation 115 described in the following) with an initialization value, e.g. a default hexadecimal value.

Here below in Table 1 is supplied an example of a portion of such Profile Package in the Profile Package file 12, which is also shown in FIG. 2.

TABLE 1

```
value02 ProfileElement ::= mf : {
        mf-header {
            mandated NULL,
            identification 2
        },
        templateID {2 23 143 1 2 1},
        mf{
            fileDescriptor : {
                lcsi '05'H,
                pinStatusTemplateDO '01810A'H
            }
        },
        ef-iccid{
            fileDescriptor : {
                lcsi '05'H,
                shortEFID '10'H
            },
            fillFileContent : '980000000000000040F5'H
        },
        ef-dir{
            fileDescriptor : {
                fileDescriptor '42210026'H,
                lcsi '05'H,
                efFileSize '98'H
            },
            fillFileContent :
'61184F10A0000000871002F310FFFF89080000FF50045553494D'H,
                fillFileOffset : 12,
            fillFileContent :
'61184F10A0000000871004F310FFFF89080000FF50044953494D'H,
                fillFileOffset : 12,
```

As shown for instance the Elementary File ef-iccid dedicated to the ICCID (Integrated Circuit Card ID) value includes an instruction fillFileContent(argument) which argument represents a customizable fixed-length field, i.e. afield to be personalized, which in FIG. 2 is indicate with F1, corresponding to the personalization field for the ICCID value in the data table 11a. In the example the field to be personalized for the ICCID is set to the initial value 980000000000000040F5'H, the H indicating a hexadecimal value. The Elementary file Ef-dir includes two other customizable fields F2, F3 also in correspondence of the instruction fillFileContent. In these cases an offset value is added after the instruction fillFileContent to allow writing the value in a file at a specified offset position. Thus it is important to observe that the ASCII Package Profile file 12 includes writing the personalization values in files and includes writing in such files at given offset positions. These methods and procedures are know per se and are detailed for instance in the already mentioned SIMalliance reference document "eUICC Profile Package:Interoperable Format Technical Specification", which in particular at page 19 FIG. 2 details the processing of the 'File' type just summarized.

Thus, then in an operation 115 the Profile Package 12 file is transformed in a personalized Profile Package 12a file substituting in the fields to be personalized $F_1 \ldots F_k \ldots F_p$ the value in the corresponding personalization fields $T1 \ldots Tp$, as mentioned a subset or all of the personalization fields $T1 \ldots Tm$ in the data table 11a, of a record $R_i$ corresponding to the specific subscription 50 in which the personalized Profile Package 12a must be stored.

Thus, a personalized Profile Package file 12a is obtained by the substitution operation 115.

Subsequently, since only Profile Packages expressed in hexadecimal code can be used and activated by the eUICC card 50, the personalized Profile Package file 12a is converted in a hexadecimal Profile Package file 13, by a DER conversion operation 120. The hexadecimal Profile Package file 13 is formed by sequences of hexadecimal codes HC1 . . . HCq.

The hexadecimal Profile Package file 13 can be then downloaded then to the eUICC 50 as described with reference to FIG. 1.

Also, in the standard GSM case domain the diversification of UICC cards is obtained by means of a batch of scripts performed by so-called "personalization machines". Each script includes the commands that change all fields to be personalized. Each script is generated from scratch. Also in this case, script generation is a time consuming operation.

Thus, at the moment, the personalization of a profile package in an eUicc card requires that: a master profile is designed (e.g. profile 12); each field of the profile which has to be personalized is replaced by a ASN.1 personalization value extracted from a table of pre-generated values (e.g. table 11a); and then a conversion from ASN1 to DER format is performed.

This method to provide generation of personalized profile package data therefore has low performances, since the substitutions of the fields within the ASN.1 values and the conversion to DER format are executed for each personalized profile.

In particular, the association between the fields which are to be personalized of the master ASN.1 profile and the final values of the DER files needs the calculation of all the offset index values for the DER format file, since this information is not contained inside the ASN1 profile itself; this operation of offset calculation has to be performed manually for each field, so it is strongly exposed to human errors, also often requiring long configuration timings.

SUMMARY

Embodiments of the present disclosure relate to solutions for the generation of personalized profile package data in smart cards. A table comprising a plurality of data records corresponding to a plurality of subscriptions to be personalized is provided. Each record comprises a plurality of personalization fields to store different types of personalization values. The method includes providing for a given subscription among the plurality of subscriptions a file for the Profile Package in an ASCII format comprising fields to be personalized corresponding to one or more of the fields to store different types of personalization values. The file for the Profile Package in an ASCII format is converted into a hexadecimal code format file, in particular a DER (Distinguished Encoding Rules) format, obtaining a first hexadecimal profile. Personalization values are selected from the personalization fields in the table stored in the record corresponding to the given subscription and the personalization values from the personalization fields are substituted in the corresponding fields to be personalized.

Embodiments of the present disclosure relate in particular to UICC (Universal Integrated Circuit Card) cards using ASCII profiles including a script, and converted in DER format.

On the basis of the foregoing description, the need is felt for solutions which overcome one or more of the previously outlined drawbacks.

According to one or more embodiments, such an object is achieved through methods having the features specifically set forth in the claims that follow. Embodiments moreover concerns a related system for the personalization of integrated circuit cards module as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a method for the generation of personalized profile package data in integrate circuit cards, comprising the operations of: providing a table comprising a plurality of data records corresponding to a plurality of subscriptions to be generated, each record comprising a plurality of personalization fields to store different types of personalization values; providing for a given subscription among the plurality of subscriptions a file for the Profile Package in an ASCII format comprising fields to be personalized corresponding to one or more of the fields to store different types of personalization values; converting the file for the Profile Package in an ASCII format into a hexadecimal code format file, in particular a DER (Distinguished Encoding Rules) format, obtaining a first hexadecimal profile; selecting personalization values from the personalization fields in the table stored in the record corresponding to the given subscription and substituting the personalization values from the personalization fields in the corresponding fields to be personalized. The method includes calculating an offset table for the given subscription indicating for each field to be personalized a corresponding offset in the hexadecimal profile; the operation of substituting the personalization values from the personalization fields in the corresponding fields to be personalized including substituting the values directly in the fields to be personalized in the file in hexadecimal format at the location indicated for each personalized field by the corresponding offset in the offset table.

In variant embodiments, the solution here described may include that the providing a file for the Profile Package in an ASCII format includes introducing metadata, in particular annotations, in correspondence of the fields to be personalized, the metadata including an instruction to create a row of the offset table for the corresponding personalization field; converting the file for the Profile Package in an ASCII format into a initial file in hexadecimal format and store the file in hexadecimal format as previous file in hexadecimal format; reading the file for the Profile Package in an ASCII format) and find a metadata; performing an offset calculation iterative procedure including creating a row of the offset table for the personalization field corresponding to the read annotation, modifying an initialization value contained in the field to be personalized obtaining a current modified file for the Profile Package in an ASCII format, converting the current modified file for the Profile Package in an ASCII format in a current hexadecimal file, comparing the current hexadecimal file with a previous hexadecimal file taking the position of their first difference as the offset value corresponding to the personalization field corresponding to the read annotation, writing the offset value in the offset field in the created row of the offset table, proceeding to read the next metadata and repeat the iterative procedure, and after reading the last metadata, perform the operation of substituting the values directly in the fields to be personalized in the file in hexadecimal format at the location indicated for each personalized field by the corresponding offset in the offset table.

In variant embodiments, the solution here described may include that in the modifying step is modified the annotated Package profile file obtained at the previous iteration and in the comparison step are compared the hexadecimal profile obtained at the current and previous (23) iteration.

In variant embodiments, the solution here described may include that in the modifying step is modified always the initial annotated Package profile file, in the comparison step are compared the current hexadecimal profile with the initial file in hexadecimal format.

In variant embodiments, the solution here described may include that the ASCII file contains a script and the metadata are annotations in the line o where a customizable field occurs signaling the personalization field corresponding to the customizable field.

In variant embodiments, the solution here described may include that the ASCII file is a ASN.1 format file and the hexadecimal code is a DER code.

In variant embodiments, the solution here described may include that the modifying the value in the customizable field includes changing the first byte of the value in the customizable field.

The present disclosure provides also solutions regarding a system for the personalization of integrated circuit cards, in particular eUICC cards, including a Mobile Network Operator and a Data Preparation server including a database of profiles comprising a personalization table, such Data Preparation server being configured to generate a personalized Profile Package according to the method of any of the above described embodiments.

In variant embodiments, the system here described may include a pre-processing module configured to read the ASCII file and to perform the iterative procedure.

The present disclosure provides also solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which:

FIGS. 1 to 3 have already been described in the foregoing;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification is not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Reference to any standard is considered reference to any standard in effect at the effective filing date of this patent.

Figures parts, elements or components which have already been described with reference to FIGS. 1 to 4 are denoted by the same references previously used in such figures; the description of such previously described elements will not be repeated in the following in order not to overburden the present detailed description.

The solution here described substantially, with respect to the method for the generation of personalized profile package data in integrated circuit cards described with reference to FIG. 2 provides additionally a procedure for calculating an offset table for the given subscription indicating for each field in the personalized package profile a corresponding offset in the hexadecimal profile. Such offset table is used to perform the personalization writing the personalization values directly in the converted hexadecimal profile package file at the offset position indicated in the table for each personalization field.

Figure 4:
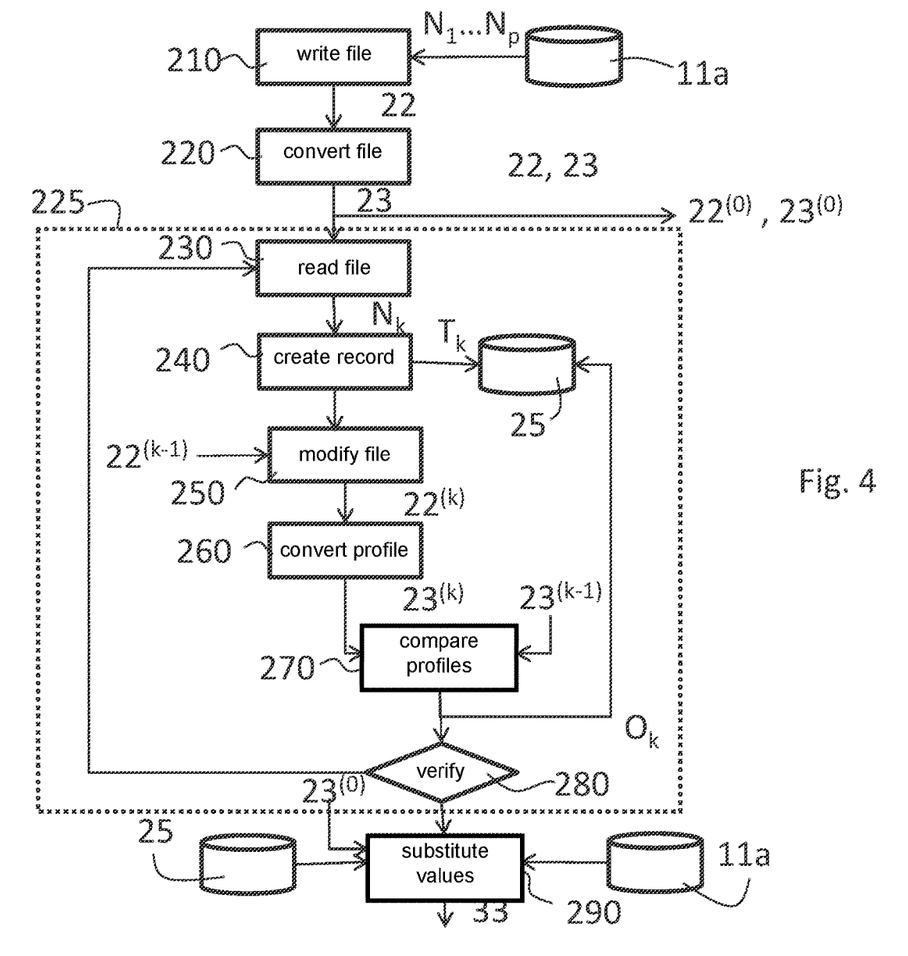
FIG. 4 shows a diagram flow illustrating an embodiment of the method here described.

Now, with reference to FIG. 4 it is illustrated an embodiment of a method for the generation of personalized profile package data in integrated circuit cards.

In FIG. 4 in particular it is shown a flow diagram representing an embodiment of such method.

Such method 200 includes, in a step 210, for a given subscription 50 writing an annotated Profile Package file 22. This is an ASCII file like the Profile Package 12 file in which the designer, in addition to writing the necessary profile elements, writes metadata $N_1 \ldots N_p$ in correspondence of each of the fields to be personalized $F_1 \ldots F_p$, in particular in the same line after the field to be personalized. In particular the designer introduces as metadata $N_1 \ldots N_P$ annotations within text comments on the line where a given field to personalized $F_k$ is in located in the annotated Profile Package file 22 in order to mark the fields to personalize.

The example of ASN.1 script of the Profile Package 12 described above with reference to FIG. 2, which can be used also here, is annotated in the way shown in Table 2 hereinbelow:

TABLE 2

```
value02 ProfileElement ::= mf : {
  mf-header {
    mandated NULL,
    identification 2
  },
  templateID {2 23 143 1 2 1},
  mf{
    fileDescriptor : {
      lcsi '05'H,
      pinStatusTemplateDO '01810A'H
    }
  },
  ef-iccid{
    fileDescriptor : {
      lcsi '05'H,
      shortEFID '10'H
    },
    fillFileContent : '980000000000000040F5'H //@ReplaceTag=T1
  },
  ef-dir{
    fileDescriptor : {
      fileDescriptor '42210026'H,
      lcsi '05'H,
      efFileSize '98'H
    },
```

TABLE 2-continued

```
    fillFileContent :
'61184F10A0000000871002F310FFFF89080000FF50045553494D'H,
    //@ReplaceTag=T6
      fillFileOffset : 12,
      fillFileContent :
'61184F10A0000000871004F310FFFF89080000FF50044953494D'H,
    //@ReplaceTag=T4
      fillFileOffset : 12,
output of operation 115
```

In correspondence of each field to be customized $F_k$ in the file 12, e.g. fillFileContent: '980000000000000040F5', H, where '980000000000000040F5' corresponds to the field to be personalized, it is introduced in the step 210 an annotation $N_k$ of the form '@ReplaceTag=$T_k$', i.e. where $T_k$ is the indication of the personalization field of the table 11a corresponding to the customizable field $F_k$ on that line, while ReplaceTag is an instruction to perform, when such annotation is found reading the annotated Profile Package file 22, an offset calculation procedure 225 that will be described in the following.

The metadata $N_k$ added, in particular, the annotation, is such that it is not converted in the DER format conversion operations, i.e. adding metadata $N_k$ in ASCII file do not change the DER file obtained from such ASCII file.

However, according to the solution here described, is for instance provided at the Data Preparation server 52a a pre-processing module which is configured to read the annotated Profile Package file 22 (see step 230) and to interpret the metadata $N_k$ as described in the following.

Then, in a step 220 the annotated Profile Package file 22 file is converted in a DER Profile Package file 23, i.e., an hexadecimal file. The annotated Profile Package 22 file and the DER Profile Package file 23 are also stored as initial versions $22^{(o)}$, $23^{(o)}$ of such files 22, 23 and the DER Profile Package 23 is also stored as previous hexadecimal file $23^{(k-1)}$. The superscript indicates the version number in a series of subsequently modified ASCII or DER files, as it will be clarified in the following.

Then, it is performed an iterative procedure for calculating an offset table 25 for the given subscription 50, indicating for each field to be personalized $F_k$ a corresponding offset value $O_k$ in a personalized hexadecimal profile 33.

Such iterative procedure includes a step of reading the annotated Profile Package 22 and finding an annotation $N_k$. k here indicates the generic k-th annotation $N_k$ for which is performed the k-th iteration of the iterative procedure. Of course, at the first iteration the reading operation 230 find the first annotation, which is in the example $N_1$, corresponding to the field to be personalized $F_1$, and indicating the personalization field $T_1$, i.e. '@ReplaceTag=$T_1$'.

Then in a step 240 it is created a row, i.e. a record of the offset table 25 for the personalization field $T_k$ corresponding to the read annotation $N_k$. The row includes two fields, the label of the personalization field $T_k$ and a field for the corresponding offset value $O_k$, as better described in the following.

The offset table 25 includes two fields, as shown here below in table 1, includes two fields, one containing the indication of the personalization field $T_k$ read in the file 22 and the other for the corresponding calculated offset $O_k$. In Table 3 is indicated after the step 240, when the first row corresponding to $T_1$ is created.

TABLE 3

| $T_k$ | $O_k$ |
|---|---|
| $T_1$ | |

Then in a step 250 the previous version $22^{(k-1)}$ of the annotated Profile Package file 22 is modified. The value in the customizable field $F_k$ corresponding to the personalization field $T_k$ is modified, in particular it is changed the first byte of the value, i.e. the value of the customizable field $F_k$, related to the annotation $N_k$ is changed. A modified, or altered, Package profile $23^{(k)}$ is obtained.

Then the modified Package profile $23^{(k)}$ is converted in a step 260 in DER format, obtaining a modified hexadecimal Package profile $23^{(k)}$.

The modified hexadecimal Package profile $22^{(k)}$ is compared in a step 270 with the modified hexadecimal Package profile $22^{(k-1)}$ obtained at the previous iteration k−1, which has been for instance also stored.

The previous modified hexadecimal Package profile $23^{(k-1)}$ and the modified hexadecimal Package profile $23^{(k)}$ are in general obtained by the conversion of respective ASCII Package profile file $22^{(k-1)}$, $22^{(k)}$, which differs only in the byte changed at step 250. Thus, the position of the first different hexadecimal code in the current modified hexadecimal Package profile $23^{(k)}$ marks the position of the offset $O_k$ at which the field to be personalized Fk is. Thus it is counted the number of codes in the current modified hexadecimal Package profile $23^{(k)}$ to arrive to such difference and taken as offset Ok for the personalized field $T_k$, which is written in the offset field of the offset table 25 in the corresponding row created during the iteration k. In Table 4 it is shown the offset table 25 after step 270, with reference to the above example of the script where the first row correspond to the personalized field $T_1$.

TABLE 4

| $T_k$ | $O_k$ |
|---|---|
| $T_1$ | $O_1$ |

Then, it is verified in a step 280 if the last annotation in the annotated Package profile file 22 was found. In the negative control returns at the beginning of the iterative procedure, continuing reading 230 the file 22 from the last annotation found. When the next annotation Nk+1 is found, steps 240-270 are performed, creating a new row in the offset table 25 for the personalized fields $T_{k+1}$ and obtaining the corresponding next offset $O_{k+1}$ by the modification step 250 and comparison step 270 described above.

It is underlined that, in the embodiment just described, in the modify step 240 is modified the annotated Package profile file 22 obtained at the previous iteration k−1, which at the beginning is the initial annotated ASCII file 22, then at each iteration adds a modification of a byte in a field to be personalized, and in the comparison step 270 are compared the DER file obtained at the current and previous iteration, i.e. DER files $23^{(k)}$ and $23^{(k-1)}$.

In variant embodiments however the modify step 250 can operate always on the initial annotated Package profile file 22, i.e. file $22^{(o)}$. In that case in the comparison step are compared the modified file DER files $23(k)$ with the initial DER file $23^{(o)}$ with the initial file in hexadecimal format.

If in the step 280 it is verified that the last annotation in the ASCII Package Profile file 22 has been processed, the offset table 25 is completed.

In Table 5 it is shown the offset table 25 after step 270, with reference to the above example of ASN.1 script where the first row corresponds to the personalized field $T_1$.

TABLE 5

| $T_k$ | $O_k$ |
|---|---|
| $T_1$ | $O_1$ |
| $T_4$ | $O_4$ |
| $T_6$ | $O_6$ |

Then, in a step 290 it is performed an operation of substituting the personalization values in the personalization fields $T_1 \ldots T_m$ from the table 11a in the corresponding fields to be personalized $F_1 \ldots F_p$ including substituting such values directly in the fields to be personalized in the file in hexadecimal format 23, i.e. the initial DER file $23^{(o)}$, at the location indicated for each personalized field $T_k$ by the corresponding offset $O_k$ in the offset table 25.

In this way, the personalized values are substituted directly in the hexadecimal file at the correct offset positions, avoiding errors in the offset calculation and resulting in a faster method, with respect to the method of FIG. 2 which substituted all the personalized values in the ASCII and the converted the personalized file 12a in DER format.

The described solution has thus better performances, since the association between the fields which are to be personalized within the master ASN.1 profile and the final values of the DER files does not need the calculation of all the offset index values for the DER format file, since this information is obtained by an automated procedure using annotation of ASN1 file and alteration of the same file, thus avoiding human errors and long configuration timings.

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A method for the generation of personalized Profile Package data in integrated circuit cards, the method comprising:

providing a table comprising a plurality of data records corresponding to a plurality of subscriptions to be generated, each record comprising a plurality of personalization fields to store different types of personalization values;

providing, for a given subscription among the plurality of subscriptions, a file for the Profile Package in an ASCII format, the file comprising fields to be personalized corresponding to one or more of the fields to store different types of personalization values;

converting the file for the Profile Package in the ASCII format into a hexadecimal code format file thereby obtaining a first hexadecimal profile, the hexadecimal code format file being a DER (Distinguished Encoding Rules) format;

selecting personalization values from the personalization fields in the table stored in the record corresponding to the given subscription;

calculating an offset table for the given subscription indicating for each field to be personalized a corresponding offset in the hexadecimal profile; and substituting the personalization values from the personalization fields in the corresponding personalization fields to be personalized including substituting the values directly in the fields to be personalized in the file in hexadecimal format at a location indicated for each personalized field by the corresponding offset in the offset table;
wherein providing the file for the Profile Package in the ASCII format comprises:
introducing metadata, in particular annotations, in correspondence of the fields to be personalized, the metadata including an instruction to create a row of the offset table for the corresponding personalization field;
converting the file for the Profile Package in the ASCII format into a initial file in hexadecimal format and store the file in hexadecimal format as previous file in hexadecimal format;
reading the file for the Profile Package in the ASCII format and find a metadata; and
performing an offset calculation iterative procedure.

2. The method of claim 1, wherein performing the offset calculation iterative procedure comprises:
creating a row of the offset table for the personalization field corresponding to a read annotation;
modifying an initialization value contained in the field to be personalized obtaining a current modified file for the Profile Package in the ASCII format;
converting the current modified file for the Profile Package in the ASCII format in a current hexadecimal file;
comparing the current hexadecimal file with a previous hexadecimal file taking the position of a first difference as an offset value corresponding to the personalization field corresponding to the read annotation;
writing the offset value in the offset field in the created row of the offset table; and
proceeding to read the next metadata and repeating the iterative procedure.

3. The method of claim 2, further comprising, after reading the last metadata, performing an operation of substituting the values directly in the fields to be personalized in the file in hexadecimal format at the location indicated for each personalized field by the corresponding offset in the offset table.

4. The method of claim 2, wherein modifying the initialization value comprises modifying an annotated Package profile file obtained at the previous iteration and the comparing comprises comparing the hexadecimal profile obtained at the current and previous iteration.

5. The method of claim 2, wherein modifying the initialization value comprises always modifying the initial annotated Package profile file and the comparing comprises comparing the current hexadecimal profile with the initial file in hexadecimal format.

6. The method of claim 1, wherein the ASCII file contains a script in ASN.1 notation and the metadata are annotations in the line o where a customizable field occurs signaling the personalization field corresponding to the customizable field.

7. The method of claim 1, wherein the ASCII file is an ASN.1 format file and the hexadecimal code is a DER code.

8. The method of claim 1, wherein a value in a customizable field is modified by changing the first byte of the value in the customizable field.

9. A system for the personalization of integrated circuit cards, the system including a Mobile Network Operator and a Data Preparation server including a database of profiles comprising a personalization table, wherein the Data Preparation server comprises a processor and a memory storing instructions to be executed by the processor, the instructions for generating a personalized Profile Package according by performing the steps of:
providing a table comprising a plurality of data records corresponding to a plurality of subscriptions to be generated, each record comprising a plurality of personalization fields to store different types of personalization values;
providing, for a given subscription among the plurality of subscriptions, a file for the Profile Package in an ASCII format, the file comprising fields to be personalized corresponding to one or more of the fields to store different types of personalization values;
converting the file for the Profile Package in the ASCII format into a hexadecimal code format file thereby obtaining a first hexadecimal profile, the hexadecimal code format file being a DER (Distinguished Encoding Rules) format;
selecting personalization values from the personalization fields in the table stored in the record corresponding to the given subscription;
calculating an offset table for the given subscription indicating for each field to be personalized a corresponding offset in the hexadecimal profile; and
substituting the personalization values from the personalization fields in the corresponding fields to be personalized including substituting the values directly in the fields to be personalized in the file in hexadecimal format at a location indicated for each personalized field by the corresponding offset in the offset table;
wherein providing the file for the Profile Package in the ASCII format comprises:
introducing metadata, in particular annotations, in correspondence of the fields to be personalized, the metadata including an instruction to create a row of the offset table for the corresponding personalization field;
converting the file for the Profile Package in the ASCII format into a initial file in hexadecimal format and store the file in hexadecimal format as previous file in hexadecimal format;
reading the file for the Profile Package in the ASCII format and find a metadata; and
performing an offset calculation iterative procedure.

10. The system of claim 9, further comprising a pre-processing module configured to read the ASCII file.

11. The system of claim 9, further comprising a pre-processing module configured to read the ASCII file and to perform the iterative procedure.

12. The system of claim 9, wherein performing the offset calculation iterative procedure comprises:
creating a row of the offset table for the personalization field corresponding to a read annotation;
modifying an initialization value contained in the field to be personalized obtaining a current modified file for the Profile Package in the ASCII format;
converting the current modified file for the Profile Package in thr ASCII format in a current hexadecimal file;
comparing the current hexadecimal file with a previous hexadecimal file taking the position of a first difference as an offset value corresponding to the personalization field corresponding to the read annotation;
writing the offset value in the offset field in the created row of the offset table; and
proceeding to read the next metadata and repeating the iterative procedure.

13. The system of claim 9, wherein system comprises a system for the personalization of erucic cards.

14. A computer-program product that can be loaded into a non-transitory memory of at least one processor and comprises portions of software code for implementing a method comprising the steps of:
- providing a table comprising a plurality of data records corresponding to a plurality of subscriptions to be generated, each record comprising a plurality of personalization fields to store different types of personalization values;
- providing, for a given subscription among the plurality of subscriptions, a file for the Profile Package in an ASCII format, the file comprising fields to be personalized corresponding to one or more of the fields to store different types of personalization values;
- converting the file for the Profile Package in the ASCII format into a hexadecimal code format file thereby obtaining a first hexadecimal profile, the hexadecimal code format file being a DER (Distinguished Encoding Rules) format;
- selecting personalization values from the personalization fields in the table stored in the record corresponding to the given subscription;
- calculating an offset table for the given subscription indicating for each field to be personalized a corresponding offset in the hexadecimal profile; and
- substituting the personalization values from the personalization fields in the corresponding fields to be personalized including substituting the values directly in the fields to be personalized in the file in hexadecimal format at the location indicated for each personalized field by the corresponding offset in the offset table;
- wherein providing the file for the Profile Package in the ASCII format comprises:
  - introducing metadata, in particular annotations, in correspondence of the fields to be personalized, the metadata including an instruction to create a row of the offset table for the corresponding personalization field;
  - converting the file for the Profile Package in the ASCII format into a initial file in hexadecimal format and store the file in hexadecimal format as previous file in hexadecimal format;
  - reading the file for the Profile Package in the ASCII format and find a metadata; and
  - performing an offset calculation iterative procedure.

15. The computer-program product of claim 14, wherein performing the offset calculation iterative procedure comprises:
- creating a row of the offset table for the personalization field corresponding to a read annotation;
- modifying an initialization value contained in the field to be personalized obtaining a current modified file for the Profile Package in the ASCII format;
- converting the current modified file for the Profile Package in the ASCII format in a current hexadecimal file;
- comparing the current hexadecimal file with a previous hexadecimal file taking the position of a first difference as the offset value corresponding to the personalization field corresponding to the read annotation;
- writing the offset value in the offset field in the created row of the offset table; and
- proceeding to read the next metadata and repeating the iterative procedure.

16. The computer-program product of claim 15, wherein the method further comprises, after reading the last metadata, performing an operation of substituting the values directly in the fields to be personalized in the file in hexadecimal format at the location indicated for each personalized field by the corresponding offset in the offset table.

17. The computer-program product of claim 14, wherein the ASCII file contains a script in ASN.1 notation and the metadata are annotations in the line o where a customizable field occurs signaling the personalization field corresponding to the customizable field.

* * * * *

UNITED STATES PATENT AND TRADEMARK OFFICE
CERTIFICATE OF CORRECTION

PATENT NO. : 11,314,852 B2
APPLICATION NO. : 16/414120
DATED : April 26, 2022
INVENTOR(S) : Marco Alfarano It is certified that error appears in the above-identified patent and that said Letters Patent is hereby corrected as shown below:

In the Claims

Claim 13, Column 13, Line 2; delete "erucic" and insert --eUICC--.

Signed and Sealed this
Fifth Day of July, 2022

Katherine Kelly Vidal
*Director of the United States Patent and Trademark Office*